US012355145B2

(12) United States Patent
Takayama

(10) Patent No.: US 12,355,145 B2
(45) Date of Patent: Jul. 8, 2025

(54) ANTENNA DEVICE

(71) Applicant: YOKOWO CO., LTD., Tokyo (JP)

(72) Inventor: Yuki Takayama, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 168 days.

(21) Appl. No.: 18/108,027

(22) Filed: Feb. 10, 2023

(65) Prior Publication Data

US 2023/0261366 A1 Aug. 17, 2023

(30) Foreign Application Priority Data

Feb. 17, 2022 (JP) ................................ 2022-022766

(51) Int. Cl.
*H01Q 1/32* (2006.01)
*H01Q 1/36* (2006.01)
*H01Q 19/00* (2006.01)
*H01Q 21/29* (2006.01)

(52) U.S. Cl.
CPC ............ *H01Q 1/3275* (2013.01); *H01Q 1/36* (2013.01); *H01Q 19/005* (2013.01); *H01Q 21/29* (2013.01)

(58) Field of Classification Search
CPC ...... H01Q 1/3275; H01Q 1/36; H01Q 19/005; H01Q 21/29
See application file for complete search history.

(56) References Cited

U.S. PATENT DOCUMENTS

| | | | | |
|---|---|---|---|---|
| 6,127,987 A * | 10/2000 | Maruyama | H01Q 1/36 343/835 |
| 2020/0059009 A1 * | 2/2020 | Sonoda | H01Q 1/523 |

FOREIGN PATENT DOCUMENTS

| | | |
|---|---|---|
| JP | 2006-504353 A | 2/2006 |
| WO | 2004/040689 A2 | 5/2004 |

* cited by examiner

*Primary Examiner* — Dieu T Duong
(74) *Attorney, Agent, or Firm* — XSENSUS LLP

(57) ABSTRACT

An antenna device includes a plurality of antenna elements, each of the plurality of antenna elements including a radiating element and at least one parasitic element. The plurality of antenna elements are arranged in a direction intersecting with an arrangement direction of the radiating element and the at least one parasitic element of at least one antenna element of the plurality of antenna elements.

12 Claims, 11 Drawing Sheets

ANTENNA DEVICE

CROSS-REFERENCE TO RELATED APPLICATION

This application is based on Japanese patent application No. 2022-022766 filed on Feb. 17, 2022, the content of which is incorporated hereinto by reference.

BACKGROUND

Technical Field

The present invention relates to an antenna device.

Related Art

In recent years, various antenna devices have been developed. For example, PCT Japanese Translation Patent Publication No. 2006-504353 discloses an example of a directional antenna. The directional antenna includes a central element and a plurality of parasitic elements disposed around the central element. The central element has a conductive radiator. Each of the parasitic elements has a monopole antenna element and an image element. When the monopole antenna element and the image element are connected to each other, each of the parasitic elements is operated in a reflection mode. When the monopole antenna element and the image element are not connected to each other, each of the parasitic elements is operated in a directional mode.

SUMMARY

For example, as disclosed in PCT Japanese Translation Patent Publication No. 2006-504353, some antenna devices may be requested to have directivity in a predetermined direction. Depending on an application of the antenna device, however, lateral directivity with respect to the predetermined direction, for example, may be requested as well as directivity in the predetermined direction. It is therefore necessary to realize a desired radiation pattern for the antenna device.

One example of an object of the present invention is to realize a desired radiation pattern for an antenna device. Another object of the present invention will be apparent from the present specification.

An aspect of the present invention is an antenna device. The antenna device includes a plurality of antenna elements, each of the plurality of antennae elements including a radiating element and at least one parasitic element. The plurality of antenna elements are arranged in a direction intersecting with an arrangement direction of the radiating element and the at least one parasitic element of at least one antenna element of the plurality of antenna elements.

According to the aspect of the present invention, a desired radiation pattern can be realized for the antenna device.

BRIEF DESCRIPTION OF THE DRAWINGS

The above and other objects, advantages and features of the present invention will be more apparent from the following description of certain preferred embodiments and modification examples taken in conjunction with the accompanying drawings, in which.

DETAILED DESCRIPTION

Figure 1:
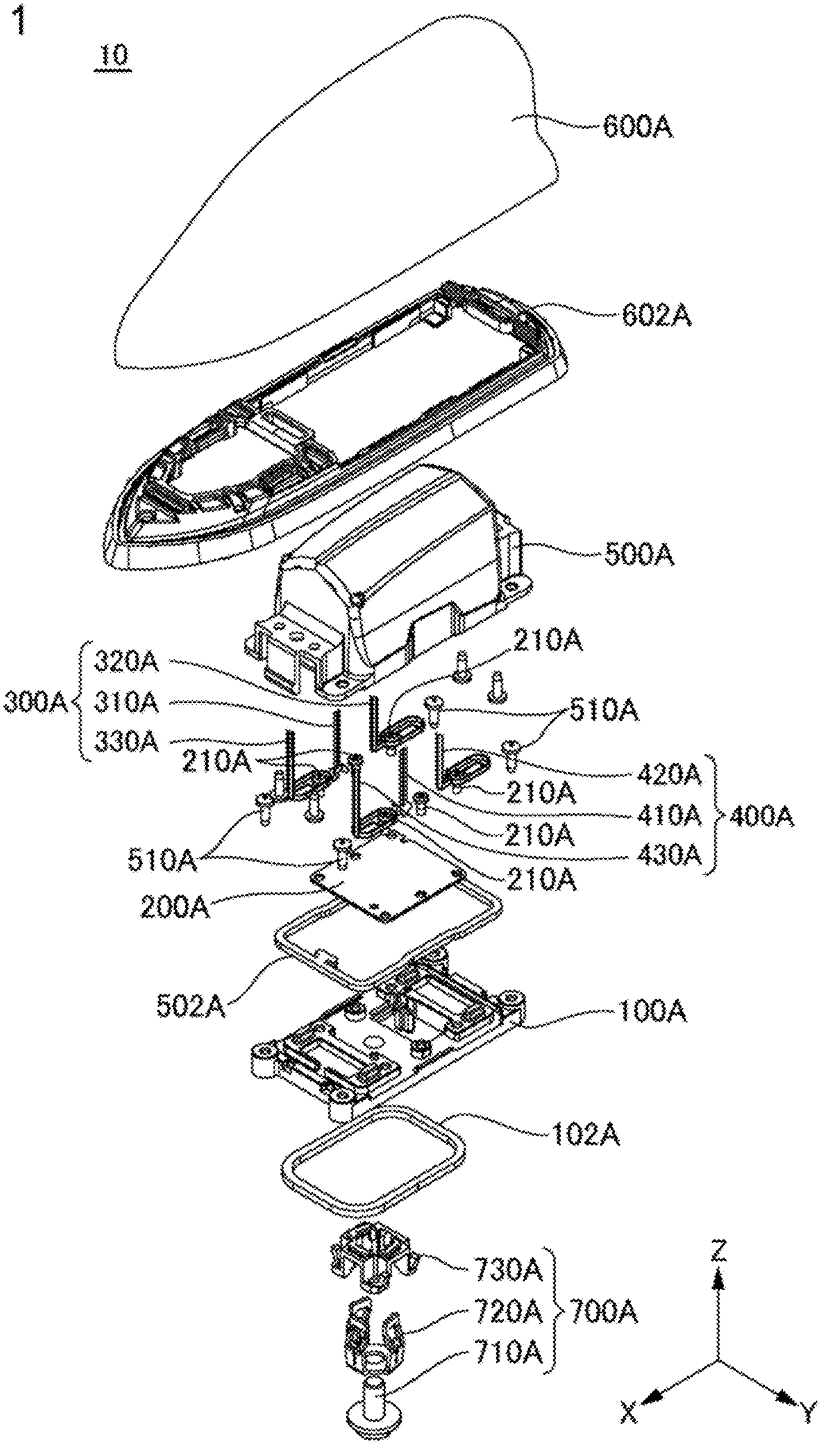
FIG. 1 is an exploded perspective view of an antenna device according to Embodiment 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, embodiments and modification examples of the present invention will be described with reference to the drawings. In all of the drawings, the same reference numerals will be assigned to the same configuration elements, and description thereof will not be repeated as appropriate.

In the present specification, unless otherwise specified, ordinal numbers such as "first", "second", and "third" are merely used to distinguish similarly named configurations, and do not imply any particular feature (for example, an order or importance) of the configurations.

FIG. 1 is an exploded perspective view of an antenna device 10 according to Embodiment 1.

In FIG. 1, an arrow indicating a first direction X, a second direction Y, or a third direction Z indicates that a direction from a base end toward a tip of the arrow is a positive direction of a direction indicated by the arrow, and a direction from the tip toward the base end of the arrow is a negative direction of the direction indicated by the arrow.

In Embodiment 1, the antenna device 10 is mounted on an upper surface side of a roof of a vehicle. For example, the vehicle is an automobile such as a freight vehicle and a passenger car. Objects on which the antenna device 10 is mounted are not limited to the vehicle.

In FIG. 1, the first direction X indicates a longitudinal direction of the vehicle on which the antenna device 10 is mounted. Specifically, the positive direction of the first direction X is a direction from rear to front of the vehicle. The negative direction of the first direction X is a direction from front to rear of the vehicle. The second direction Y is orthogonal to the first direction X. The second direction Y indicates a lateral direction of the vehicle. Specifically, the positive direction of the second direction Y is a direction from right to left of the vehicle. The negative direction of the second direction Y is a direction from left to right of the vehicle. The third direction Z is orthogonal to both the first direction X and the second direction Y. The third direction Z indicates a vertical direction of the vehicle. Specifically, the positive direction of the third direction Z is a direction from bottom to top of the vehicle. The negative direction of the third direction Z is a direction from top to bottom of the vehicle. Hereinafter, a plane perpendicular to the third direction Z may be referred to as a "horizontal plane" as necessary.

The antenna device 10 according to Embodiment 1 includes a base 100A, an attachment seal member 102A, a substrate 200A, a first antenna element 300A, a second antenna element 400A, an inner case 500A, an inner pad 502A, an outer case 600A, an outer pad 602A, and a fastener 700A. The first antenna element 300A has a first radiating element 310A, a first director element 320A, and a first reflector element 330A. The second antenna element 400A has a second radiating element 410A, a second director element 420A, and a second reflector element 430A. The fastener 700A has a fastening screw 710A, a washer 720A, and a holder 730A.

The base 100A consists of metal, for example. The base 100A is mounted on an upper surface side of a roof (not illustrated) via the attachment seal member 102A. The attachment seal member 102A consists of an elastic material such as elastomer and rubber. When viewed in the third direction Z, the attachment seal member 102A is a surrounding body surrounding the fastener 700A. The provided attachment seal member 102A can suppress moisture from entering a gap between a lower surface of the base 100A and an upper surface of the roof.

The substrate 200A is mounted on an upper surface side of the base 100A. The substrate 200A is a printed circuit board (PCB), for example. The substrate 200A is attached to the base 100A by six substrate attachment screws 210A.

The first antenna element 300A is a Wi-Fi (registered trademark) antenna, for example. The first antenna element 300A is disposed above the base 100A via the substrate 200A. When viewed from above, the first antenna element 300A is located on a right side of a center of the base 100A in the second direction Y. The first antenna element 300A is an array antenna constituted by the first radiating element 310A, the first director element 320A, and the first reflector element 330A.

The second antenna element 400A is a Bluetooth (registered trademark) antenna, for example. The second antenna element 400A is disposed above the base 100A via the substrate 200A. When viewed from above, the second antenna element 400A is located on a left side of the center of the base 100A in the second direction Y. The second antenna element 400A is an array antenna constituted by the second radiating element 410A, the second director element 420A, and the second reflector element 430A.

The inner case 500A is mounted on the upper surface side of the base 100A via the inner pad 502A. The inner pad 502A consists of an elastic material such as elastomer and rubber. When viewed in the third direction Z, the inner pad 502A is a surrounding body surrounding the substrate 200A, the first antenna element 300A, and the second antenna element 400A. The provided inner pad 502A can suppress moisture from entering a gap between a lower end of the inner case 500A and the upper surface of the base 100A.

The inner case 500A covers the substrate 200A, the first antenna element 300A, and the second antenna element 400A from above the base 100A. Thus, the inner case 500A forms with the base 100A an accommodation space for accommodating the substrate 200A, the first antenna element 300A, and the second antenna element 400A. The inner case 500A is attached to the base 100A by four case attachment screws 510A.

The outer case 600A is mounted on the upper surface side of the roof via the outer pad 602A. The outer pad 602A consists of an elastic material such as elastomer and rubber. When viewed in the third direction Z, a portion of the outer pad 602A from a center portion in the first direction X to an end portion on a side in the negative direction of the first direction X is a surrounding body surrounding the base 100A, the substrate 200A, the first antenna element 300A, the second antenna element 400A, and the inner case 500A.

The fastener 700A fastens the base 100A to the roof, and electrically grounds the base 100A to the roof. Specifically, the roof is provided with an attachment hole for attaching the antenna device 10. The holder 730A is disposed inside the attachment hole. The washer 720A is held by the holder 730A. The fastening screw 710A penetrates in the third direction Z through a through hole provided in the washer 720A, and is screwed into a screw hole provided on a lower surface of the base 100A. By screwing the fastening screw 710A into the screw hole of the base 100A, a tip of a claw provided in the washer 720A contacts with the lower surface of the roof. The base 100A is thus fastened to the roof. The base 100A is also electrically grounded to the roof via the fastening screw 710A and the washer 720A.

Figure 2:
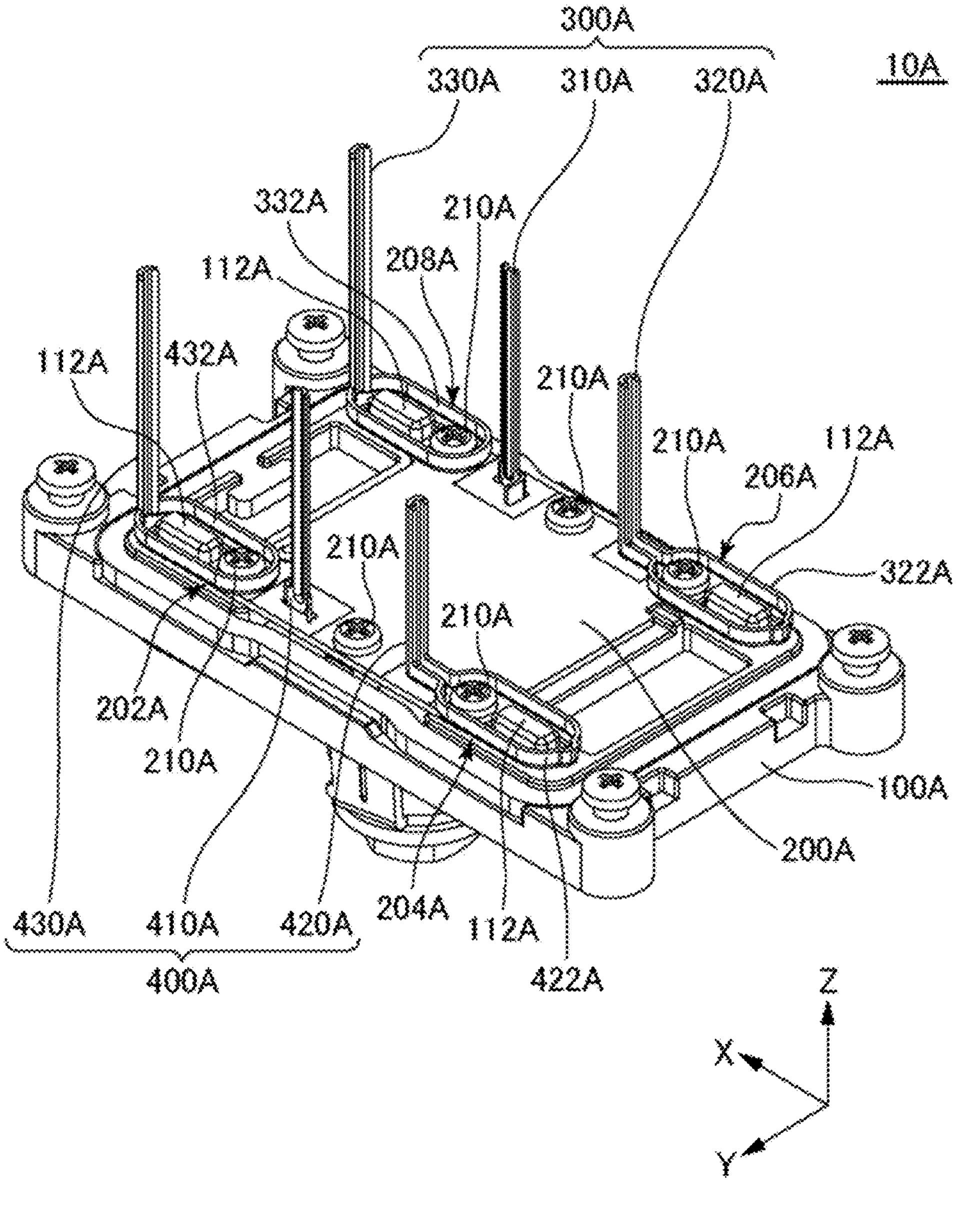
FIG. 2 is a perspective view of the antenna device according to Embodiment 1 with an inner case, an outer case, and an outer pad removed.

FIG. 2 is a perspective view of the antenna device 10 according to Embodiment 1 with the inner case 500A, the outer case 600A, and the outer pad 602A removed. Hereinafter, the antenna device according to Embodiment 1 illustrated in FIG. 2 is referred to as an antenna device 10A.

When viewed in the third direction Z, the substrate 200A has a substantially square shape. When viewed in the third direction Z, the substrate 200A has a first corner portion 202A located on a side in the positive direction of the first direction X and on a side in the positive direction of the second direction Y. When viewed in the third direction Z, the substrate 200A has a second corner portion 204A located on a side in the negative direction of the first direction X and on a side in the positive direction of the second direction Y. When viewed in the third direction Z, the substrate 200A has a third corner portion 206A located on a side in the negative direction of the first direction X and on a side in the negative direction of the second direction Y. When viewed in the third direction Z, the substrate 200A has a fourth corner portion 208A located on a side in the positive direction of the first direction X and on a side in the negative direction of the second direction Y. However, a shape of the substrate 200A is not limited to this example.

The first radiating element 310A is a monopole element substantially parallel to the third direction Z. A length of the first radiating element 310A in the third direction Z is approximately ¼ times a wavelength of an operating frequency of the first antenna element 300A.

A lower end of the first radiating element 310A is attached to the substrate 200A by soldering. The first radiating element 310A is disposed between the third corner portion 206A and the fourth corner portion 208A. Specifically, the first radiating element 310A is disposed closer to the fourth corner portion 208A than to the third corner portion 206A. However, a method of attaching the first radiating element 310A to the substrate 200A and a position at which the first radiating element 310A is attached are not limited to this example.

The first director element 320A is a monopole element substantially parallel to the third direction Z. The first director element 320A is also a parasitic element. The lower end of the first director element 320A is electrically connected to a ground such as the roof. The length of the first director element 320A in the third direction Z is shorter than the length of the first radiating element 310A in the third direction Z. The length of the first director element 320A in the third direction Z is, for example, shorter than approximately ¼ times the wavelength of the operating frequency of the first antenna element 300A.

A first attachment portion 322A extends from the lower end of the first director element 320A toward the negative direction of the first direction X. The first attachment portion 322A is integrated with the first director element 320A. A portion of the first attachment portion 322A on a side in the negative direction of the first direction X of the third corner portion 206A is provided with an insertion hole into which a rib 112A provided on a portion of the upper surface of the base 100A on a side in the negative direction of the first direction X of the third corner portion 206A is inserted. The first director element 320A is aligned by inserting the rib 112A into the insertion hole. A portion of the first attachment portion 322A overlapping the third corner portion 206A in the third direction Z, as well as the third corner portion 206A, is attached to the base 100A by the substrate attachment screw 210A provided at the third corner portion 206A. However, a method of attaching the first director element 320A to the base 100A and the substrate 200A is not limited to this example.

The first reflector element 330A is a monopole element substantially parallel to the third direction Z. The first reflector element 330A is also a parasitic element. The lower end of the first reflector element 330A is electrically connected to the ground such as the roof. The length of the first reflector element 330A in the third direction Z is longer than the length of the first radiating element 310A in the third direction Z. The length of the first reflector element 330A in the third direction Z is, for example, longer than approximately ¼ times the wavelength of the operating frequency of the first antenna element 300A.

A second attachment portion 332A extends from the lower end of the first reflector element 330A toward the negative direction of the first direction X. The second attachment portion 332A is integrated with the first reflector element 330A. A portion of the second attachment portion 332A on a side in the positive direction of the first direction X of the fourth corner portion 208A is provided with an insertion hole into which the rib 112A provided on a portion of the upper surface of the base 100A on a side in the positive direction of the first direction X of the fourth corner portion 208A is inserted. The first reflector element 330A is aligned by inserting the rib 112A into the insertion hole. A portion of the second attachment portion 332A overlapping the fourth corner portion 208A in the third direction Z, as well as the fourth corner portion 208A, is attached to the base 100A by the substrate attachment screw 210A provided at the fourth corner portion 208A. However, a method of attaching the first reflector element 330A to the base 100A and the substrate 200A is not limited to this example.

The second radiating element 410A is a monopole element substantially parallel to the third Z direction. The length of the second radiating element 410A in the third direction Z is approximately ¼ times the wavelength of the operating frequency of the second antenna element 400A. The length of the second radiating element 410A in the third direction Z is approximately equal to the length of the first radiating element 310A in the third direction Z.

The lower end of the second radiating element 410A is attached to the substrate 200A by soldering. The second radiating element 410A is disposed between the first corner portion 202A and the second corner portion 204A. Specifically, the second radiating element 410A is disposed closer to the first corner portion 202A than to the second corner portion 204A. However, a method of attaching the second radiating element 410A to the substrate 200A and a position at which the second radiating element 410A is attached are not limited to this example.

The second director element 420A is a monopole element substantially parallel to the third direction Z. The second director element 420A is also a parasitic element. The lower end of the second director element 420A is electrically connected to the ground such as the roof. The length of the second director element 420A in the third direction Z is shorter than the length of the second radiating element 410A in the third direction Z. The length of the second director element 420A in the third direction Z is, for example, shorter than approximately ¼ times the wavelength of the operating frequency of the second antenna element 400A. The length of the second director element 420A in the third direction Z is also approximately equal to the length Z of the first director element 320A in the third direction.

A third attachment portion 422A extends from the lower end of the second director element 420A toward the negative direction of the first direction X. The third attachment portion 422A is integrated with the second director element 420A. A portion of the third attachment portion 422A on a side in the negative direction of the first direction X of the second corner portion 204A is provided with an insertion hole into which the rib 112A provided on a portion of the upper surface of the base 100A on a side in the negative direction of the first direction X of the second corner portion 204A is inserted. The second director element 420A is aligned by inserting the rib 112A into the insertion hole. A portion of the third attachment portion 422A overlapping the second corner portion 204A in the third direction Z, as well as the second corner portion 204A, is attached to the base 100A by the substrate attachment screw 210A provided at the second corner portion 204A. However, a method of attaching the second director element 420A to the base 100A and the substrate 200A is not limited to this example.

The second reflector element 430A is a monopole element substantially parallel to the third direction Z. The second reflector element 430A is also a parasitic element. The lower end of the second reflector element 430A is electrically connected to the ground such as the roof. The length of the second reflector element 430A in the third direction Z is longer than the length of the second radiating element 410A in the third direction Z. The length of the second reflector element 430A in the third direction Z is, for example, longer than approximately ¼ times the wavelength of the operating frequency of the second antenna element 400A. The length of the second reflector element 430A in the third direction Z is also approximately equal to the length of the first reflector element 330A in the third direction Z.

A fourth attachment portion 432A extends from the lower end of the second reflector element 430A toward the negative direction of the first direction X. The fourth attachment portion 432A is integrated with the second reflector element 430A. A portion of the fourth attachment portion 432A on a side in the positive direction of the first direction X of the first corner portion 202A is provided with an insertion hole into which the rib 112A provided on a portion of the upper surface of the base 100A on a side in the positive direction of the first direction X of the first corner portion 202A is inserted. The second reflector element 430A is aligned by inserting the rib 112A into the insertion hole. A portion of the fourth attachment portion 432A overlapping the first corner portion 202A in the third direction Z, as well as the first corner portion 202A, is attached to the base 100A by the substrate attachment screw 210A provided at the first corner portion 202A. However, a method of attaching the second reflector element 430A to the base 100A and the substrate 200A is not limited to this example.

When viewed in the third direction Z, the first radiating element 310A, the first director element 320A, and the first reflector element 330A are arranged substantially parallel to the first direction X. Specifically, when viewed in the third direction Z, the first director element 320A is disposed on a side in the negative direction of the first direction X with respect to the first radiating element 310A. When viewed in the third direction Z, the first reflector element 330A is disposed on a side in the positive direction of the first direction X with respect to the first radiating element 310A.

When viewed in the third direction Z, the second radiating element 410A, the second director element 420A, and the second reflector element 430A are arranged substantially parallel to the first direction X. Specifically, when viewed in the third direction Z, the second director element 420A is disposed on a side in the negative direction of the first direction X with respect to the second radiating element 410A. When viewed in the third direction Z, the second reflector element 430A is disposed on a side in the positive direction of the first direction X with respect to the second radiating element 410A.

When viewed in the third direction Z, the first radiating element 310A and the second radiating element 410A are arranged substantially parallel to the second direction Y. When viewed in the third direction Z, the first director element 320A and the second director element 420A are arranged substantially parallel to the second direction Y. When viewed in the third direction Z, the first reflector element 330A and the second reflector element 430A are arranged substantially parallel to the second direction Y. Accordingly, when viewed in the third direction Z, the first director element 320A is disposed on a side in the negative direction of the first direction X and on a side in the negative direction of the second direction Y with respect to the second radiating element 410A. When viewed in the third direction Z, the first reflector element 330A is disposed on a side the positive direction of the first direction X and on a side in the negative direction of the second direction Y with respect to the second radiating element 410A. When viewed in the third direction Z, the second director element 420A is disposed on a side in the negative direction of the first direction X and on a side in the positive direction of the second direction Y with respect to the first radiating element 310A. When viewed in the third direction Z, the second reflector element 430A is disposed on a side in the positive direction of the first direction X and on a side in the positive direction of the second direction Y with respect to the first radiating element 310A.

Figure 3:
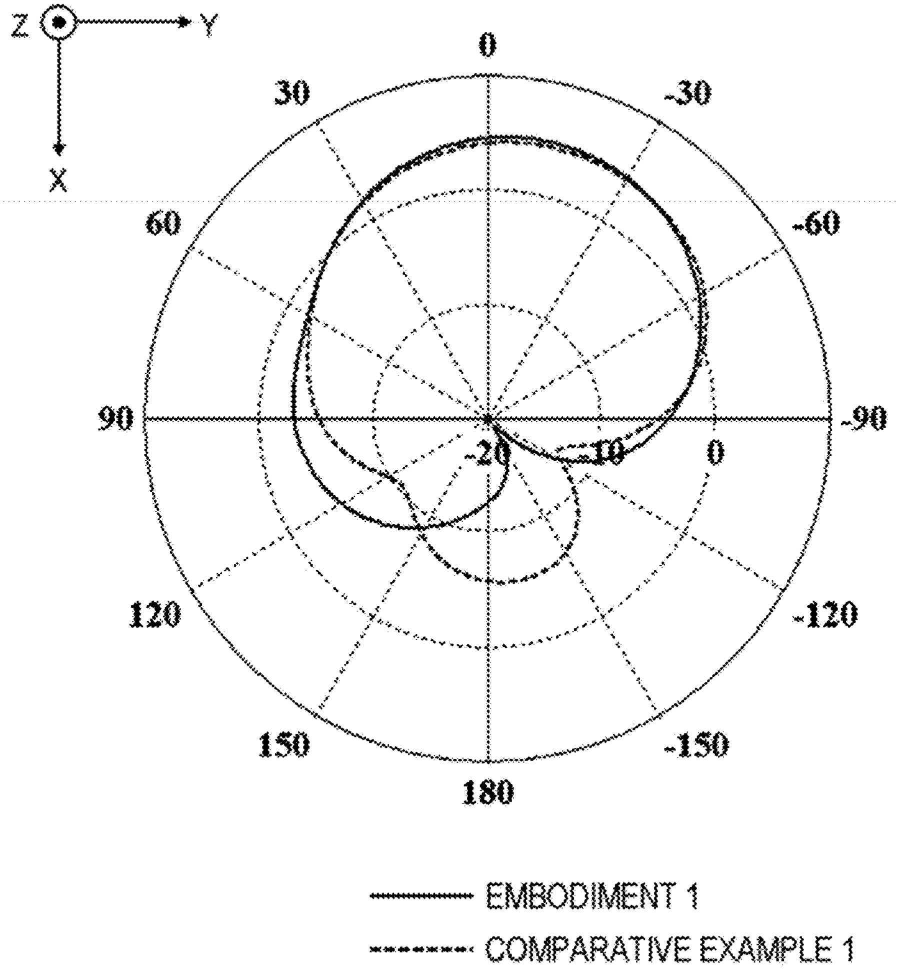
FIG. 3 is a graph illustrating directivity at 2,400 MHz in a horizontal plane of the antenna device according to Embodiment 1 and directivity at 2,400 MHz in a horizontal plane of an antenna device according to Comparative Example 1.

FIG. 3 is a graph illustrating directivity at 2,400 MHz in the horizontal plane of the antenna device 10A according to Embodiment 1 and directivity at 2,400 MHz in the horizontal plane of an antenna device according to Comparative Example 1. The antenna device according to Comparative Example 1 is the same as the antenna device 10A according to Embodiment 1, except that the second antenna element 400A is not provided.

In FIG. 3, a white circle with a black dot indicating that a third direction Z indicates a direction from a back side toward a front side of a paper surface is the positive direction of the third direction Z, and a direction from the front side toward the back side of the paper surface is the negative direction of the third direction Z. Numbers attached to an outer periphery of a graph illustrated in FIG. 3 indicate directions (unit: degrees) in the horizontal plane. In the graph illustrated in FIG. 3, the negative direction of the first direction X is a direction of 0°, the negative direction of the second direction Y is a direction of 90°, the positive direction of the second direction Y is a direction of −90°, and the positive direction of the first direction X is a direction of 180°. In the graphs illustrated in FIGS. 3 to 5, numbers attached in the direction of −90° from a center of the graph indicate gains (unit: dBi).

Referring to FIGS. 2 and 3, the antenna device 10A according to Embodiment 1 and the antenna device according to Comparative Example 1 will be compared with each other.

In the antenna device 10A according to Embodiment 1, radiation of radio waves from the first radiating element 310A to a side where the first director element 320A is located can be induced as compared to a case where the first director element 320A is not provided. Radiation of radio waves from the first radiating element 310A to a side where the first reflector element 330A is located can be blocked as compared to a case where the first reflector element 330A is not provided. Radiation of radio waves from the second radiating element 410A to a side where the second director element 420A is located can be induced as compared to a case where the second director element 420A is not provided. Radiation of radio waves from the second radiating element 410A to a side where the second reflector element 430A is located can be blocked as compared to a case where the second reflector element 430A is not provided. Accordingly, as illustrated in FIG. 3, in Embodiment 1, the gain in a direction around 0° is higher than the gain in a direction around 180°. That is, directivity on the side in the negative direction of the first direction X is realized in Embodiment 1.

In the antenna device 10A according to Embodiment 1, radiation of radio waves from the first radiating element 310A to a side where the second reflector element 430A is located can be blocked as compared to a case where the second reflector element 430A is not provided. Radiation of radio waves from the second radiating element 410A to a side where the first reflector element 330A is located can be blocked as compared to a case where the first reflector element 330A is not provided. Accordingly, as illustrated in FIG. 3, the gain in the direction around 180° is lower in Embodiment 1 than in Comparative Example 1. That is, directivity on the opposite side to the negative direction of the first direction X which is a directivity direction can be more suppressed in Embodiment 1 than in Comparative Example 1.

Figure 5:
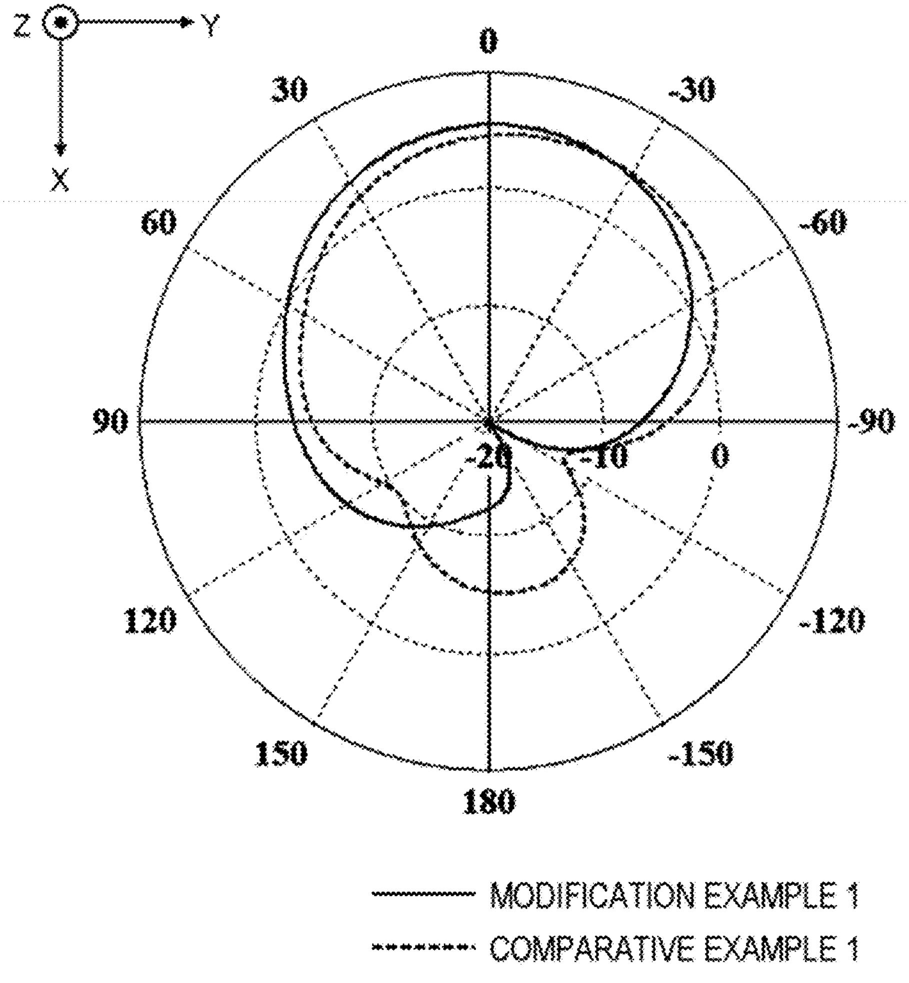
FIG. 5 is a graph illustrating directivity at 2,400 MHz in the horizontal plane of the antenna device according to Modification Example 1 and directivity at 2,400 MHz in the horizontal plane of the antenna device according to Comparative Example 1.

In the antenna device 10A according to Embodiment 1, radiation of radio waves from the first radiating element 310A to a side where the second director element 420A is located can be induced as compared to a case where the second director element 420A is not provided. Radiation of radio waves from the second radiating element 410A to a side where the first director element 320A is located can be induced as compared to a case where the first director element 320A is not provided. Accordingly, as illustrated in FIG. 5, the gain in the direction around 90° and the gain in the direction around −90° are higher in Embodiment 1 than in Comparative Example 1. That is, directivity on the lateral side with respect to the negative direction of the first direction X which is the directivity direction can be more improved in Embodiment 1 than in Comparative Example 1.

In Embodiment 1, a plurality of antenna elements are arranged in a direction intersecting with an arrangement direction of the radiating element and at least one parasitic element of at least one antenna element of the plurality of antenna elements. Specifically, in Embodiment 1, the first antenna element 300A and the second antenna element 400A are arranged substantially parallel to the second direction Y. According to comparison between Embodiment 1 and Comparative Example 1, at least one of induction and blocking of radiation of radio waves from the radiating element of one of the first antenna element 300A and the second antenna element 400A is performed by the parasitic element of the other antenna element of the first antenna element 300A and the second antenna element 400A. Accordingly, a desired radiation pattern can be realized for the antenna device 10A by properly arranging the first antenna element 300A and the second antenna element 400A.

An arrangement of the first antenna element 300A and the second antenna element 400A is not limited to arrangement according to the embodiment. For example, a position of the first radiating element 310A in the first direction X and a position of the second radiating element 410A in the first direction X may be shifted from each other in the first direction X. A position of the first director element 320A in the first direction X and a position of the second director element 420A in the first direction X may be shifted from each other in the first direction X. A position of the first reflector element 330A in the first direction X and a position of the second reflector element 430A in the first direction X may be shifted from each other in the first direction X.

In Embodiment 1, when viewed in the third direction Z, the arrangement direction of the first radiating element 310A, the first director element 320A, and the first reflector element 330A, and the arrangement direction of the second radiating element 410A, the second director element 420A, and the second reflector element 430A are substantially parallel to each other in the first direction X. Accordingly, the directivity of the first antenna element 300A and the directivity of the second antenna element 400A can be aligned substantially in the same direction.

In the examples illustrated in FIGS. 2 and 3, the operating frequency of the first antenna element 300A and the operating frequency of the second antenna element 400A are substantially the same as each other. When the operating frequencies are substantially the same as each other, radio waves from one radiating element of the first antenna element 300A and the second antenna element 400A can be more likely to be affected by the other parasitic element of the first antenna element 300A and the second antenna element 400A, as compared to a case where the operating frequencies are different from each other. However, the operating frequency of the first antenna element 300A and the operating frequency of the second antenna element 400A may be different from each other.

In the examples illustrated in FIGS. 2 and 3, a distance in the first direction X between the first radiating element 310A and the second radiating element 410A is equal to or shorter than approximately ¼ times the wavelength of the operating frequency of the first antenna element 300A or the wavelength of the operating frequency of the second antenna element 400A. When the distance is equal to or shorter than approximately ¼ times the operating frequency, radio waves from one radiating element of the first antenna element 300A and the second antenna element 400A can be more likely to be affected by the other parasitic element of the first antenna element 300A and the second antenna element 400A, as compared to a case where the distance is longer than approximately ¼ times the operating frequency. However, the distance may be longer than approximately ¼ times the wavelength of the operating frequency.

Figure 4:
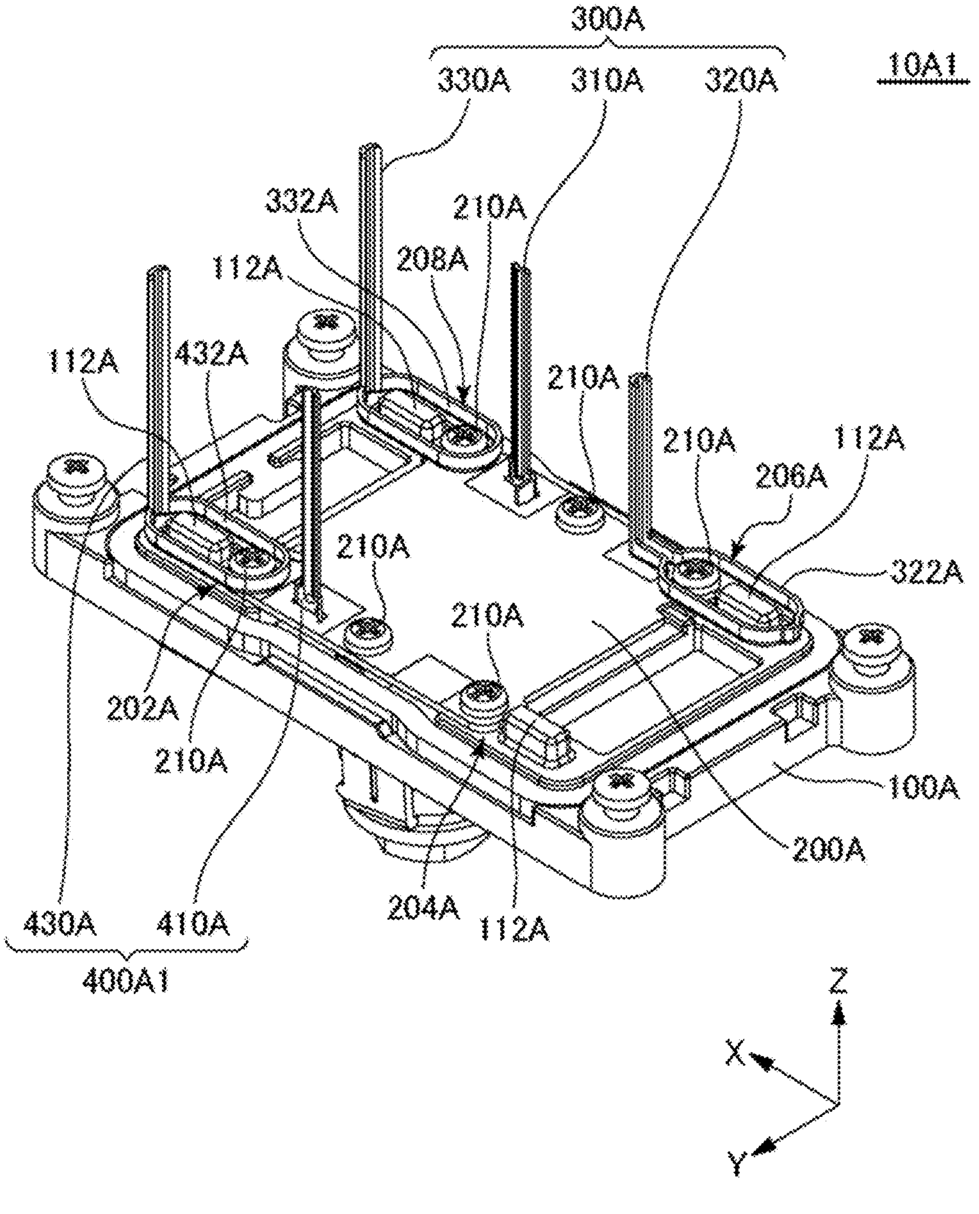
FIG. 4 is a perspective view illustrating an antenna device according to Modification Example 1 with the inner case, the outer case, and the outer pad removed from the same configuration as the antenna device illustrated in FIG. 1.

FIG. 4 is a perspective view illustrating an antenna device according to Modification Example 1 with the inner case 500A, the outer case 600A, and the outer pad 602A removed from the same configuration as the antenna device 10 illustrated in FIG. 1. Hereinafter, the antenna device according to Modification Example 1 illustrated in FIG. 4 is referred to as an antenna device 10A1. FIG. 5 is a graph illustrating directivity at 2,400 MHz in the horizontal plane of the antenna device 10A1 according to Modification Example 1 and directivity at 2,400 MHz in the horizontal plane of the antenna device according to Comparative Example 1. The antenna device 10A1 according to Modification Example 1 is the same as the antenna device 10A according to Embodiment 1, except that a second antenna element 400A1 is constituted by the second radiating element 410A and the second reflector element 430A and does not include the second director element 420A.

Referring to FIGS. 4 and 5, the antenna device 10A1 according to Modification Example 1 and the antenna device according to Comparative Example 1 will be compared with each other.

In the antenna device 10A1 according to Modification Example 1, radiation of radio waves from the first radiating element 310A to a side where the first director element 320A is located can be induced as compared to a case where the first director element 320A is not provided. Radiation of radio waves from the first radiating element 310A to a side where the first reflector element 330A is located can be blocked as compared to a case where the first reflector element 330A is not provided. Radiation of radio waves from the second radiating element 410A to a side where the second reflector element 430A is located can be blocked as compared to a case where the second reflector element 430A is not provided. Accordingly, as illustrated in FIG. 5, in Modification Example 1, the gain in the direction around 0° is higher than the gain in the direction around 180°. That is, directivity on the side in the negative direction of the first direction X is realized in Modification Example 1.

In the antenna device 10A1 according to Modification Example 1, radiation of radio waves from the first radiating element 310A to a side where the second reflector element 430A is located can be blocked as compared to a case where the second reflector element 430A is not provided. Radiation of radio waves from the second radiating element 410A to a side where the first reflector element 330A is located can be blocked as compared to a case where the first reflector element 330A is not provided. Accordingly, as illustrated in FIG. 5, the gain in the direction around 180° is lower in Modification Example 1 than in Comparative Example 1. That is, directivity on the opposite side to the negative direction of the first direction X which is the directivity direction can be more suppressed in Modification Example 1 than in Comparative Example 1.

In the antenna device 10A1 according to Modification Example 1, radiation of radio waves from the second radiating element 410A to a side where the first director element 320A is located can be induced as compared to a case where the first director element 320A is not provided. Accordingly, as illustrated in FIG. 5, the gain in the direction around 90° is higher in Modification Example 1 than in Comparative Example 1. That is, directivity on the lateral side with respect to the negative direction of the first direction X which is the directivity direction can be more improved in Modification Example 1 than in Comparative Example 1.

Figure 6:
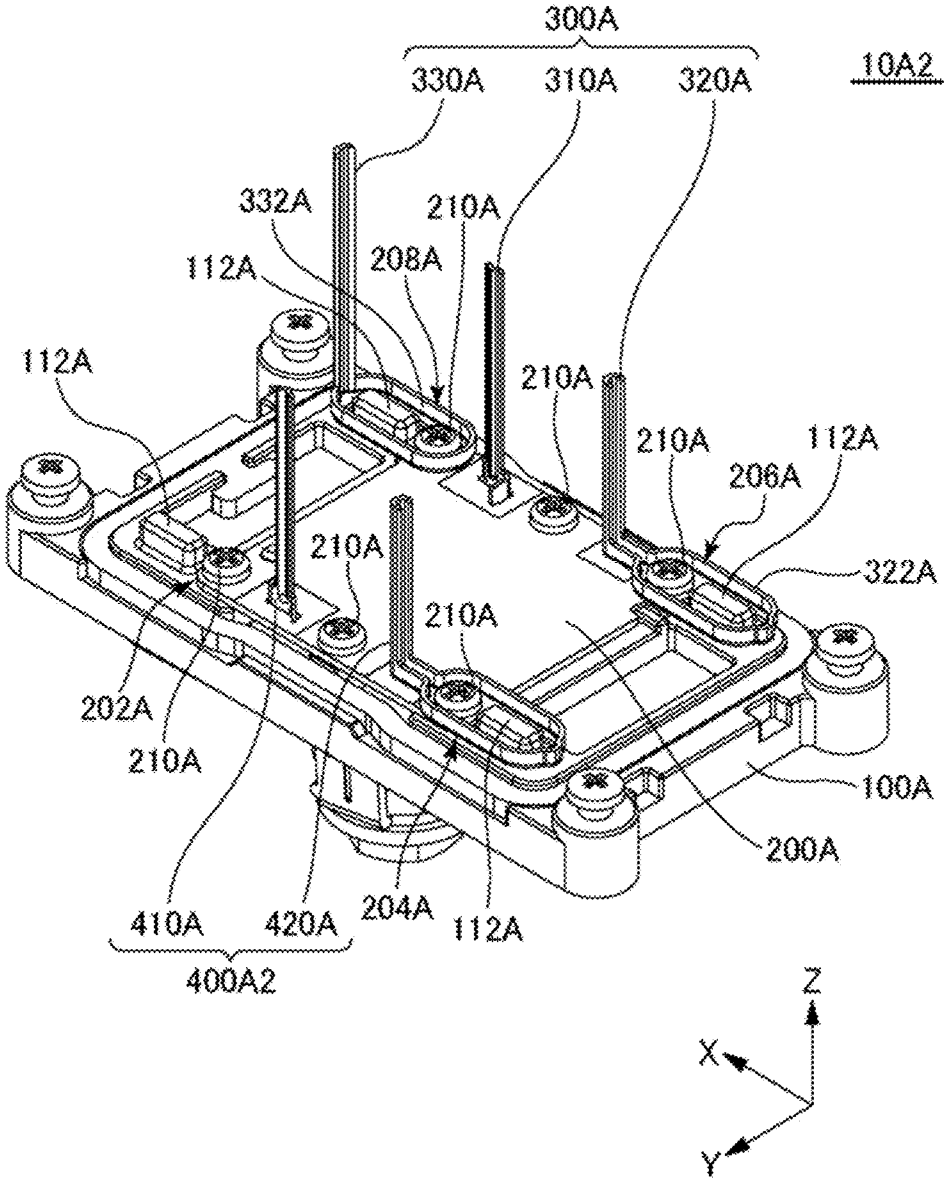
FIG. 6 is a perspective view illustrating an antenna device according to Modification Example 2 with the inner case, the outer case, and the outer pad removed from the same configuration as the antenna device illustrated in FIG. 1.
Figure 7:
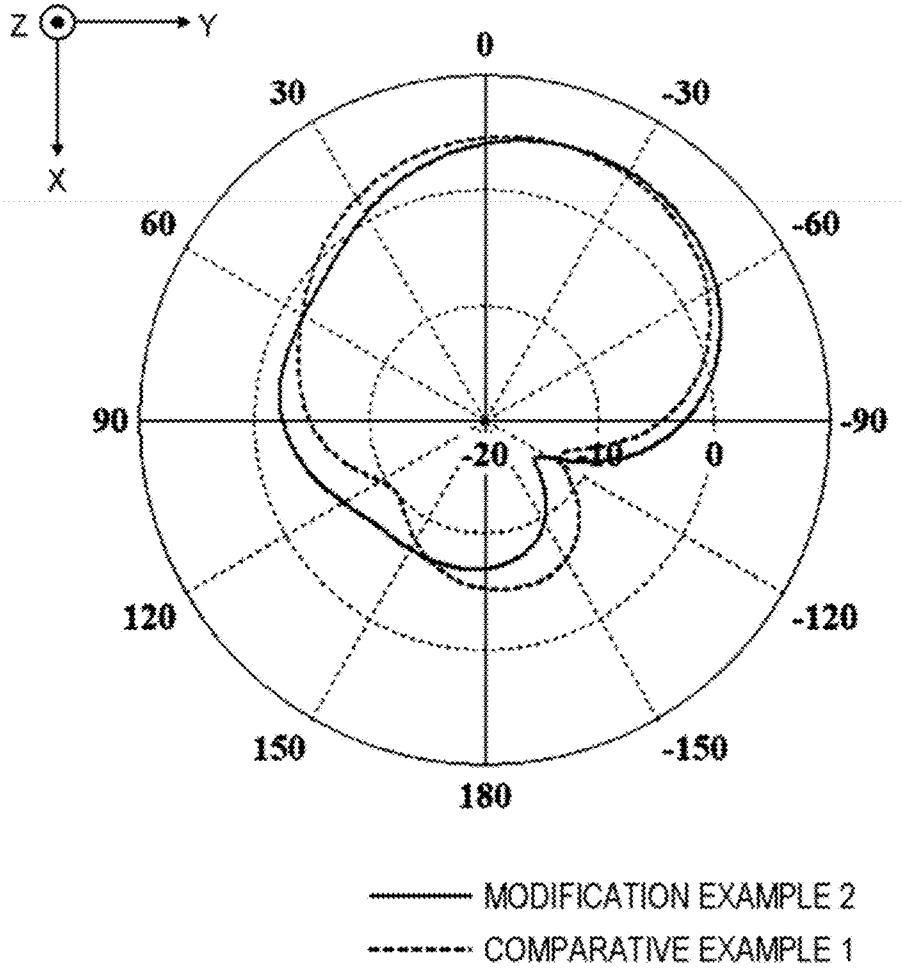
FIG. 7 is a graph illustrating directivity at 2,400 MHz in the horizontal plane of the antenna device according to Modification Example 2 and directivity at 2,400 MHz in the horizontal plane of the antenna device according to Comparative Example 1.

FIG. 6 is a perspective view illustrating an antenna device according to Modification Example 2 with the inner case 500A, the outer case 600A, and the outer pad 602A removed from the same configuration as the antenna device 10 illustrated in FIG. 1. Hereinafter, the antenna device according to Modification Example 2 illustrated in FIG. 6 is referred to as an antenna device 10A2. FIG. 7 is a graph illustrating directivity at 2,400 MHz in the horizontal plane of the antenna device 10A2 according to Modification Example 2 and directivity at 2,400 MHz in the horizontal plane of the antenna device according to Comparative Example 1. The antenna device 10A2 according to Modification Example 2 is the same as the antenna device 10A according to Embodiment 1, except that the second antenna element 400A2 is constituted by the second radiating element 410A and the second director element 420A and does not include the second reflector element 430A.

Referring to FIGS. 6 and 7, the antenna device 10A2 according to Modification Example 2 and the antenna device according to Comparative Example 1 will be compared with each other.

In the antenna device 10A2 according to Modification Example 2, radiation of radio waves from the first radiating element 310A to a side where the first director element 320A is located can be induced as compared to a case where the first director element 320A is not provided. Radiation of radio waves from the first radiating element 310A to a side where the first reflector element 330A is located can be blocked as compared to a case where the first reflector element 330A is not provided. Radiation of radio waves from the second radiating element 410A to a side where the second director element 420A is located can be induced as compared to a case where the second director element 420A is not provided. Accordingly, as illustrated in FIG. 7, in Modification Example 2, the gain in the direction around 0° is higher than the gain in the direction around 180°. That is, directivity on the side in the negative direction of the first direction X is realized in Modification Example 2.

In the antenna device 10A2 according to Modification Example 2, radiation of radio waves from the second radiating element 410A to a side where the first reflector element 330A is located can be blocked as compared to a case where the first reflector element 330A is not provided. Accordingly, as illustrated in FIG. 7, the gain in the direction around 180° is lower in Modification Example 2 than in Comparative Example 1. That is, directivity on the opposite side to the negative direction of the first direction X which is the directivity direction can be more suppressed in Modification Example 2 than in Comparative Example 1.

In the antenna device 10A2 according to Modification Example 2, radiation of radio waves from the first radiating element 310A to a side where the second director element 420A is located can be induced as compared to a case where the second director element 420A is not provided. Radiation of radio waves from the second radiating element 410A to a side where the first director element 320A is located can be induced as compared to a case where the first director element 320A is not provided. Accordingly, as illustrated in FIG. 7, the gain in the direction around 90° and the gain in the direction around −90° are higher in Modification Example 2 than in Comparative Example 1. That is, directivity on the lateral side with respect to the negative direction of the first direction X which is the directivity direction can be more improved in Modification Example 2 than in Comparative Example 1.

Figure 8:
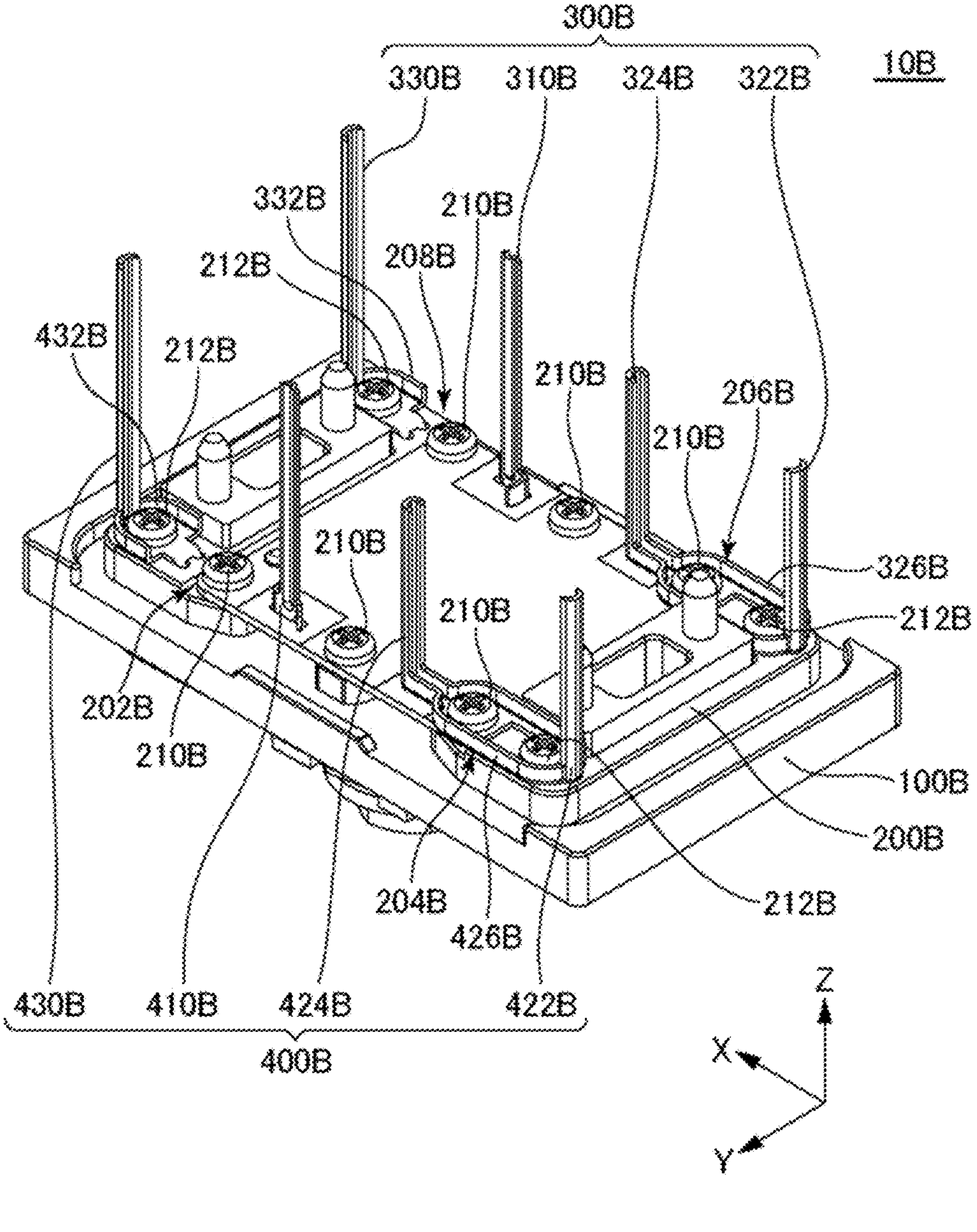
FIG. 8 is a perspective view of an antenna device according to Embodiment 2 with an inner case, an outer case, and an outer pad removed.

FIG. 8 is a perspective view of antenna device according to Embodiment 2 with the inner case, the outer case, and the outer pad removed. Hereinafter, the antenna device according to Embodiment 2 illustrated in FIG. 8 is referred to as an antenna device 10B. The antenna device 10B according to Embodiment 2 is the same as the antenna device 10A according to Embodiment 1 except for the following points.

A substrate 200B is mounted on an upper surface side of a base 100B. As in Embodiment 1, when viewed in the third direction Z, the substrate 200B has a substantially square shape having a first corner portion 202B, a second corner portion 204B, a third corner portion 206B, and a fourth corner portion 208B. The substrate 200B is attached to a base 100B by six substrate attachment screws 210B. However, a shape of the substrate 200B is not limited to this example.

The first antenna element 300B according to Embodiment 2 has a first radiating element 310B, a first director element 322B, a second director element 324B, and a first reflector element 330B. When viewed in the third direction Z, the first radiating element 310B, the first director element 322B, the second director element 324B, and the first reflector element 330B are arranged substantially parallel to the first direction X.

The first director element 322B is disposed on a side in the negative direction of the first direction X with respect to the second director element 324B. The second director element 324B is disposed on a side in the positive direction of the first direction X with respect to the first director element 322B. The first director element 322B and the second director element 324B are integrated with each other via a first attachment portion 326B. The first attachment portion 326B is provided between the lower end of the first director element 322B and the lower end of the second director element 324B. A portion of the first attachment portion 326B overlapping the third corner portion 206B in the third direction Z, as well as the third corner portion 206B, is attached to the base 100B by a substrate attachment screw 210B provided at the third corner portion 206B. A portion of the first attachment portion 326B located on a side in the negative direction of the first direction X with respect to the third corner portion 206B is attached to the base 100B by an antenna attachment screw 212B located on a side in the negative direction of the first direction X with respect to the third corner portion 206B. However, a method of attaching the first director element 322B and the second director element 324B to the base 100B and the substrate 200B is not limited to this example.

A second attachment portion 332B is provided on a side in the negative direction of the first direction X of the lower end of the first reflector element 330B. The second attachment portion 332B is integrated with the first reflector element 330B. The second attachment portion 332B is disposed on a side in the positive direction of the first direction X with respect to the fourth corner portion 208B. The second attachment portion 332B is attached to the base 100B by an antenna attachment screw 212B provided on a side in the positive direction of the first direction X with respect to the fourth corner portion 208B. However, a method of attaching the first reflector element 330B to the base 100B is not limited to this example.

The first antenna element 300B according to Embodiment 2 has two director elements. Accordingly, directivity of the first antenna element 300B on the side in the negative direction of the first direction X can be stronger as compared to a case where the first antenna element 300B has only one director element. The first antenna element 300B may have three or more director elements. In this case, for example, three or more director elements are arranged substantially parallel to the first direction X.

A second antenna element 400B according to Embodiment 2 has a second radiating element 410B, a third director element 422B, a fourth director element 424B, and a second reflector element 430B. When viewed in the third direction Z, the second radiating element 410B, the third director element 422B, the fourth director element 424B, and the second reflector element 430B are arranged substantially parallel to the first direction X.

The third director element 422B is disposed on a side in the negative direction of the first direction X with respect to the fourth director element 424B. The fourth director element 424B is disposed on a side in the positive direction of the first direction X with respect to the third director element 422B. The third director element 422B and the fourth director element 424B are integrated with each other via a third attachment portion 426B. The third attachment portion 426B is provided between the lower end of the third director element 422B and the lower end of the fourth director element 424B. A portion of the third attachment portion 426B overlapping the second corner portion 204B in the third direction Z, as well as the second corner portion 204B, is attached to the base 100B by a substrate attachment screw 210B provided at the second corner portion 204B. A portion of the third attachment portion 426B located on a side in the negative direction of the first direction X with respect to the second corner portion 204B is attached to the base 100B by an antenna attachment screw 212B located on a side in the negative direction of the first direction X with respect to the second corner portion 204B. However, a method of attaching the third director element 422B and the fourth director element 424B to the base 100B and the substrate 200B is not limited to this example.

A fourth attachment portion 432B is provided on a side in the negative direction of the first direction X of the lower end of the second reflector element 430B. The fourth attachment portion 432B is integrated with the second reflector element 430B. The fourth attachment portion 432B is located on a side in the positive direction of the first direction X with respect to the first corner portion 202B. The fourth attachment portion 432B is attached to the base 100B by an antenna attachment screw 212B provided on a side in the positive direction of the first direction X with respect to the first corner portion 202B. However, a method of attaching the second reflector element 430B to the base 100B is not limited to this example.

The second antenna element 400B according to Embodiment 2 has two director elements. Accordingly, directivity of the second antenna element 400B on the side in the negative direction of the first direction X can be stronger as compared to a case where the second antenna element 400B has only one director element. The second antenna element 400B may have three or more director elements. In this case, for example, three or more director elements are arranged substantially parallel to the first direction X.

In Embodiment 2, when viewed in the third direction Z, the first radiating elements 310B and the second radiating elements 410B are arranged substantially parallel to the second direction Y. When viewed in the third direction Z, the first director element 322B and the third director element 422B are arranged substantially parallel to the second direction Y. When viewed in the third direction Z, the second director element 324B and the fourth director element 424B are arranged substantially parallel to the second direction Y. When viewed in the third direction Z, the first reflector element 330B and the second reflector element 430B are arranged substantially parallel to the second direction Y.

Figure 9:
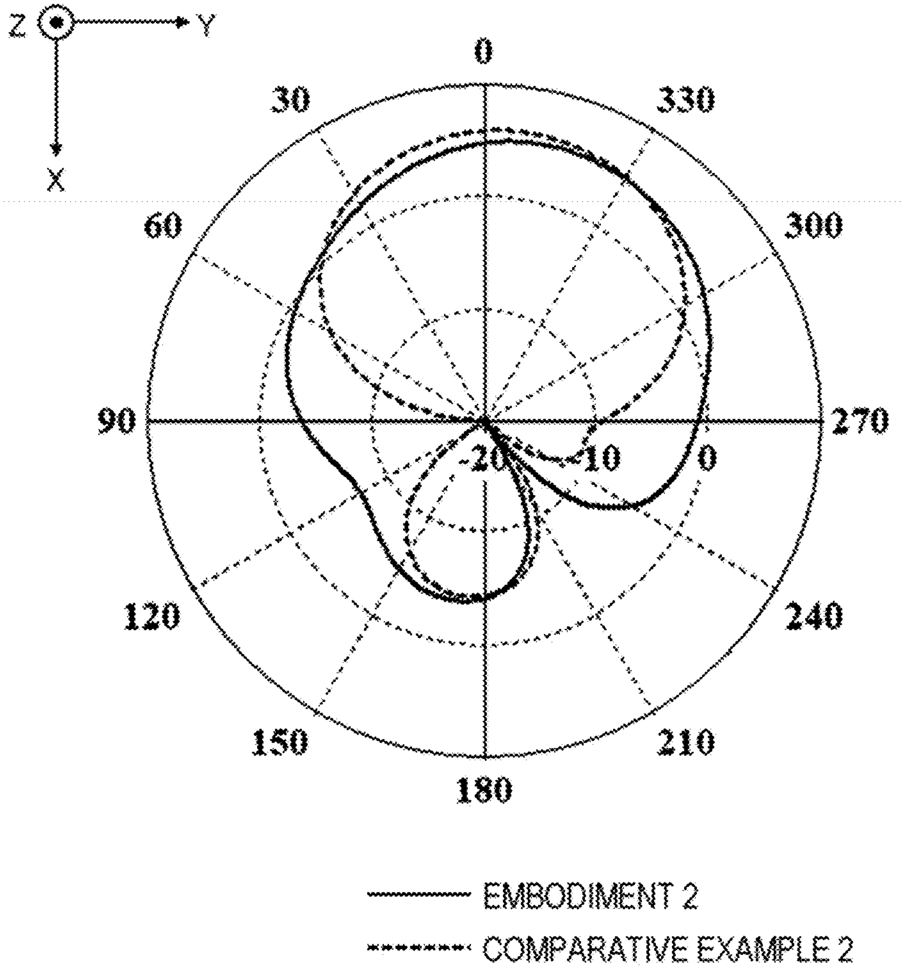
FIG. 9 is a graph illustrating directivity at 2,400 MHz in the horizontal plane of the antenna device according to Embodiment 2 and directivity at 2,400 MHz in the horizontal plane of an antenna device according to Comparative Example 2.

FIG. 9 is a graph illustrating directivity at 2,400 MHz in the horizontal plane of the antenna device 10B according to Embodiment 2 and directivity at 2,400 MHz in the horizontal plane of an antenna device according to Comparative Example 2. The antenna device according to Comparative Example 2 is the same as the antenna device 10B according to Embodiment 2, except that the second antenna element 400B is not provided.

Referring to FIGS. 8 and 9, the antenna device 10B according to Embodiment 2 and the antenna device according to Comparative Example 2 will be compared with each other.

In the antenna device 10B according to Embodiment 2, radiation of radio waves from the first radiating element 310B to a side where the first director element 322B and the second director element 324B are located can be induced as compared to a case where the first director element 322B and the second director element 324B are not provided. Radiation of radio waves from the first radiating element 310B to a side where the first reflector element 330B is located can be blocked as compared to a case where the first reflector element 330B is not provided. Radiation of radio waves from the second radiating element 410B to a side where the third director element 422B and the fourth director element 424B are located can be induced as compared to a case where the third director element 422B and the fourth director element 424B are not provided. Radiation of radio waves from the second radiating element 410B to a side where the second reflector element 430B is located can be blocked as compared to a case where the second reflector element 430B is not provided. Accordingly, as illustrated in FIG. 9, in Embodiment 2, the gain in the direction around 0° is higher than the gain in the direction around 180°. That is, directivity on the side in the negative direction of the first direction X is realized in Embodiment 2.

In the antenna device 10B according to Embodiment 2, radiation of radio waves from the first radiating element 310B to a side where the third director element 422B and the fourth director element 424B are located can be induced as compared to a case where the third director element 422B and the fourth director element 424B are not provided. Radiation of radio waves from the second radiating element 410B to a side where the first director element 322B and the second director element 324B are located can be induced as compared to a case where the first director element 322B and the second director element 324B are not provided. Accordingly, as illustrated in FIG. 9, the gain in the direction around 90° and the gain in the direction around −90° are higher in Embodiment 2 than in Comparative Example 2. That is, directivity on the lateral side with respect to the negative direction of the first direction X which is the directivity direction can be more improved in Embodiment 2 than in Comparative Example 2.

In Embodiment 2, each of the first antenna element 300B and the second antenna element 400B has two director elements. Accordingly, as illustrated in FIGS. 9 and 3, the improvement in the gain in the direction around 90° and the improvement in the gain in the direction around −90° in Embodiment 2 relative to Comparative Example 2 is more remarkable than the improvement in the gain in the direction around 90° and the improvement in the gain in the direction around −90° in Embodiment 1 relative to Comparative Example 1.

Figure 10:
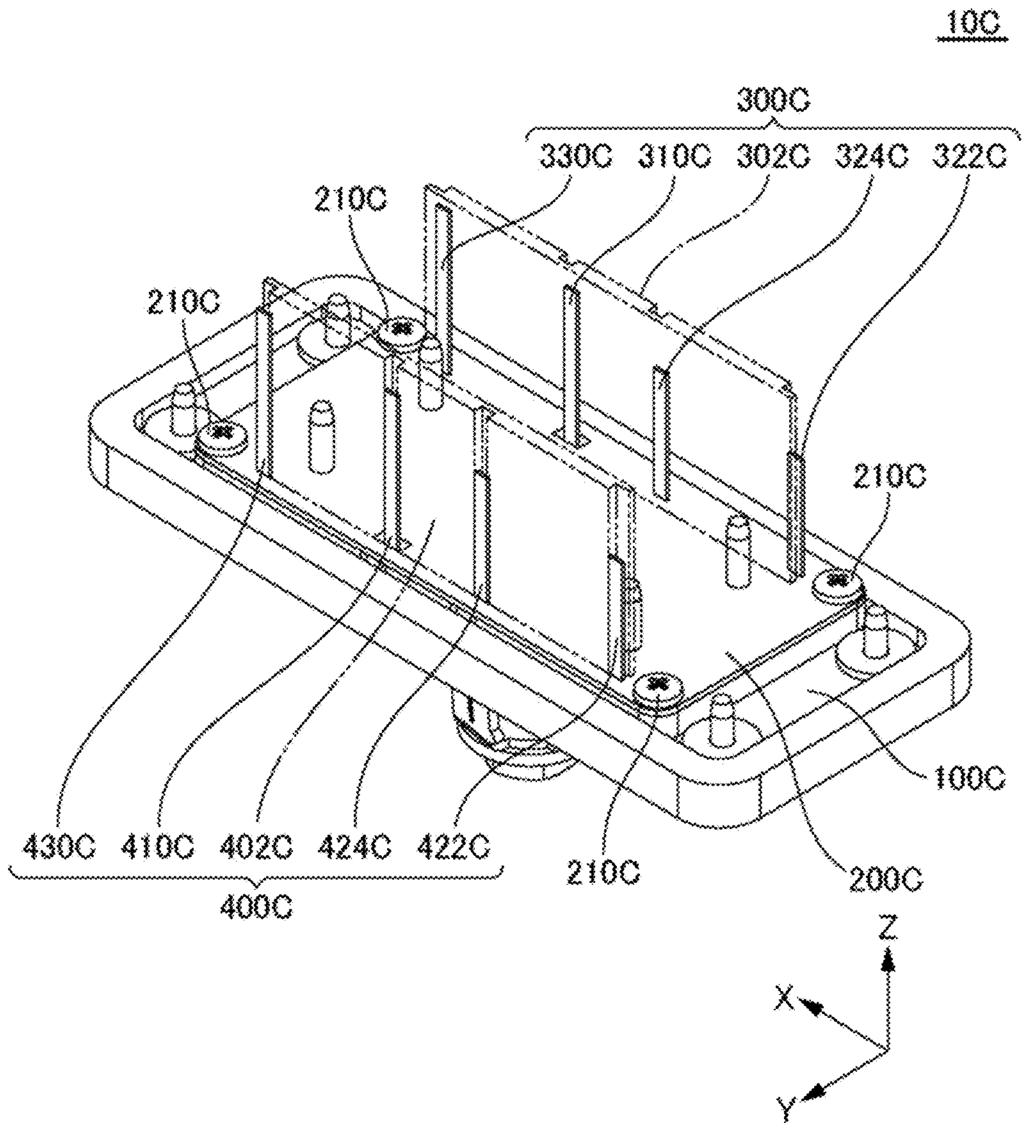
FIG. 10 is a perspective view of an antenna device according to Embodiment 3 with an inner case, an outer case, and an outer pad are removed.

FIG. 10 is a perspective view of an antenna device according to Embodiment 3 with the inner case, the outer case, and the outer pad removed. Hereinafter, the antenna device according to Embodiment 3 illustrated in FIG. 10 is referred to as an antenna device 10C. The antenna device 10C according to Embodiment 3 is the same as the antenna device 10B according to Embodiment 2 except for the following points.

In Embodiment 3, a substrate 200C is mounted on an upper surface side of a base 100C. When viewed in the third direction Z, the substrate 200C has a substantially rectangular shape having a pair of long sides substantially parallel to the first direction X and a pair of short sides substantially parallel to the second direction Y. Four corner portions of the substrate 200C when viewed in the third direction Z are attached to a base 100C by four substrate attachment screws 210C. However, a shape of the substrate 200C is not limited to this example.

A first antenna element 300C according to Embodiment 3 includes a first dielectric 302C, a first radiating element 310C, a first director element 322C, a second director element 324C, and a first reflector element 330C. The second antenna element 400C according to Embodiment 3 includes a second dielectric 402C, a second radiating element 410C, a third director element 422C, a fourth director element 424C, and a second reflector element 430C. As in Embodiment 2, when viewed in the third direction Z, the first radiating element 310C, the first director element 322C, the second director element 324C, and the first reflector element 330C are arranged substantially parallel to the first direction X. When viewed in the third direction Z, the second radiating element 410C, the third director element 422C, the fourth director element 424C, and the second reflector element 430C are arranged substantially parallel to the first direction X. When viewed in the third direction Z, the first radiating element 310C and the second radiating element 410C are arranged substantially parallel to the second direction Y. When viewed in the third direction Z, the first director element 322C and the third director element 422C are arranged substantially parallel to the second direction Y. When viewed in the third direction Z, the second director element 324C and the fourth director element 424C are arranged substantially parallel to the second direction Y. When viewed in the third direction Z, the first reflector element 330C and the second reflector element 430C are arranged substantially parallel to the second direction Y.

The first dielectric 302C is a resin, for example. The first dielectric 302C covers at least a portion of the first radiating element 310C, the first director element 322C, the second director element 324C, and the first reflector element 330C. The first dielectric 302C has a flat plate shape substantially perpendicular to the second direction Y. For example, the first dielectric 302C is a resin body covering a conductor constituting each of the first radiating element 310C, the first director element 322C, the second director element 324C, and the first reflector element 330C. However, the first dielectric 302C may be a resin substrate provided with a conductor pattern constituting each of the first radiating element 310C, the first director element 322C, the second director element 324C, and the first reflector element 330C. A structure of the first dielectric 302C is not limited to this example.

In Embodiment 3, the wavelength of radio waves radiated from the first antenna element 300C can be shortened as compared to a case where the first dielectric 302C is not provided. Accordingly, the length of each of the first radiating element 310C, the first director element 322C, the second director element 324C, and the first reflector element 330C in the third direction Z for obtaining radio waves having a desired wavelength can be shortened in Embodiment 3 as compared to a case where the first dielectric 302C is not provided. Thus, a height of the antenna device 10C in the third direction Z can be reduced in Embodiment 3 as compared to a case where the first dielectric 302C is not provided.

The second dielectric 402C is a resin, for example. The second dielectric 402C covers at least a portion of the second radiating element 410C, the third director element 422C, the fourth director element 424C, and the second reflector element 430C. The second dielectric 402C has a flat plate shape substantially perpendicular to the second direction Y. For example, the second dielectric 402C is a resin body covering a conductor constituting each of the second radiating element 410C, the third director element 422C, the fourth director element 424C, and the second reflector element 430C. However, the second dielectric 402C may be a resin substrate provided with a conductor pattern constituting each of the second radiating element 410C, the third director element 422C, the fourth director element 424C, and the second reflector element 430C. A structure of the second dielectric 402C is not limited to this example.

In Embodiment 3, the wavelength of radio waves radiated from the second antenna element 400C can be shortened as compared to a case where the second dielectric 402C is not provided. Accordingly, the length of each of the second radiating element 410C, the third director element 422C, the fourth director element 424C, and the second reflector element 430C in the third direction Z for obtaining radio waves having a desired wavelength can be shortened in Embodiment 3 as compared to a case where the second dielectric 402C is not provided. Thus, the height of the antenna device 10C in the third direction Z can be reduced in Embodiment 3 as compared to a case where the second dielectric 402C is not provided.

In Embodiment 3, both the first antenna element 300C and the second antenna element 400C are provided with a dielectric. However, only one of the first antenna element 300C and the second antenna element 400C may be provided with the dielectric. When both the first antenna element 300C and the second antenna element 400C are provided with the dielectric, the dielectric provided in the first antenna element 300C and the dielectric provided in the second antenna element 400C may be integrated with each other.

Figure 11:
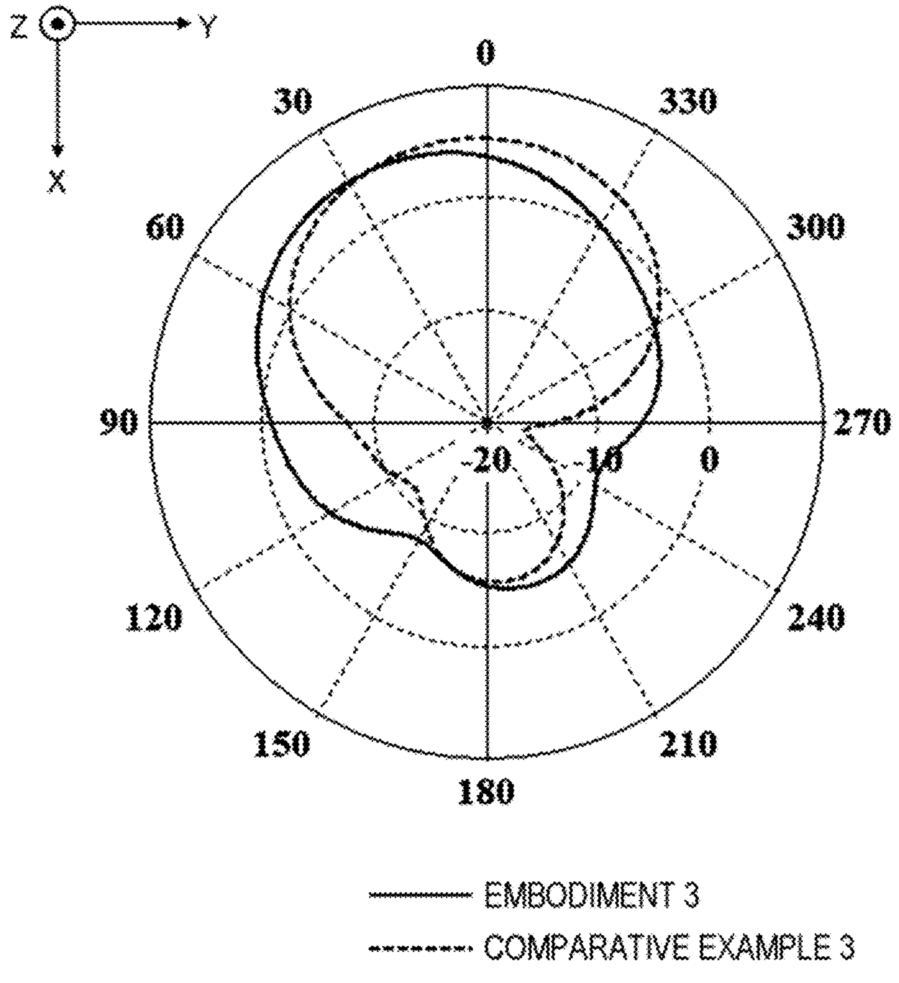
FIG. 11 is a graph illustrating directivity at 2,400 MHz in the horizontal plane of an antenna device according to Embodiment 3 and directivity at 2,400 MHz in the horizontal plane of an antenna device according to Comparative Example 3.

FIG. 11 is a graph illustrating directivity at 2,400 MHz in the horizontal plane of the antenna device 10C according to Embodiment 3 and directivity at 2,400 MHz in the horizontal plane of an antenna device according to Comparative Example 3. The antenna device according to Comparative Example 3 is the same as the antenna device 10C according to Embodiment 3, except that the second antenna element 400C is not provided.

For the same reason as that described in Embodiment 2, as illustrated in FIG. 11, in Embodiment 3, the gain in the direction around 0° is higher than the gain in the direction around 180°. That is, directivity on the side in the negative direction of the first direction X is realized in Embodiment 3.

For the same reason as that described in Embodiment 2, as illustrated in FIG. 11, the gain in the direction around 90° and the gain in the direction around −90° are higher in Embodiment 3 than in Comparative Example 3. That is, directivity on the lateral side with respect to the negative direction of the first direction X which is the directivity direction can be more improved in Embodiment 3 than in Comparative Example 3.

Hitherto, the embodiments and the modification examples of the present invention have been described with reference to the drawings. However, these are examples of the present invention, and various configurations other than those described above may be adopted.

For example, in each embodiment and each modification example, the antenna device includes two antenna elements. However, the antenna device may include three or more antenna elements. For example, each of the three or more antenna elements includes the radiating element and at least one parasitic element arranged with the radiating element. The three or more antenna elements are arranged in the direction intersecting with the arrangement direction of the radiating element and the at least one parasitic element of at least one of the antenna elements. Also in this example, a desired radiation pattern can be realized for the antenna device by properly arranging the three or more antenna elements.

In each of the embodiments and modification examples, the first antenna element has both the director element and the reflector element. However, when the second antenna element has the reflector element, the first antenna element may not have the reflector element, and may have only the director element. In this example, directivity is realized in the direction from the radiating element toward the director element of the first antenna element. Also, radio waves from the radiating element of the first antenna element can be blocked to a side where the reflector element of the second antenna element is located. Accordingly, directivity on the opposite side to the directivity direction of the first antenna element can be decreased as compared to a case where the second antenna element is not provided. Alternatively, when the second antenna element has the director element, the first antenna element may not have the director element, and may have only the reflector element. In this example, directivity is realized in the direction from the reflector element toward the radiating element of the first antenna element. Also, radiation of radio waves from the radiating element of the first antenna element can be induced to a side where the director element of the second antenna element is located. Accordingly, directivity on the lateral side with respect to the directivity direction of the first antenna element can be increased as compared to a case where the second antenna element is not provided.

In each of embodiments, each antenna element has one reflector element. However, each antenna element may have two or more reflector elements.

According to the present specification, an antenna device of the following aspects are provided.

(Aspect 1)

In Aspect 1, an antenna device includes a plurality of antenna elements, each of the plurality of antenna elements including a radiating element and at least one parasitic element. The plurality of antenna elements are arranged in a direction intersecting with an arrangement direction of the radiating element and the at least one parasitic element of at least one antenna element of the plurality of antenna elements.

According to the above aspect, at least one of induction and blocking of radiation of radio waves from the radiating element of at least one antenna element of the plurality of antenna elements is performed by the parasitic element of at least one other antenna element of the plurality of antenna elements. Accordingly, a desired radiation pattern can be realized for the antenna device by properly arranging the plurality of antenna elements.

(Aspect 2)

In Aspect 2, the at least one parasitic element of a predetermined antenna element of the plurality of antenna elements includes a director element disposed on a predetermined side with respect to the radiating element of the predetermined antenna element, and the at least one parasitic element of a predetermined other antenna element of the plurality of antenna elements includes a reflector element disposed on a side opposite to the predetermined side with respect to the radiating element of the predetermined other antenna element.

According to the above aspect, directivity is realized in the direction from the radiating element toward the director element of the predetermined antenna element. Also, radiation of radio waves from the radiating element of the predetermined antenna element can be blocked to a side where the reflector element of the predetermined other antenna element is located. Accordingly, directivity on the opposite side to the directivity direction of the predetermined antenna element can be suppressed as compared to a case where the predetermined other antenna element is not provided. According to the above aspect, directivity is realized in the direction from the reflector element toward the radiating element of the predetermined other antenna element. Also, radiation of radio waves from the radiating element of the predetermined other antenna element can be induced to a side where the director element of the predetermined antenna element is located. Accordingly, directivity on the lateral side with respect to the directivity direction of the predetermined other antenna element can be improved as compared to a case where the predetermined antenna element is not provided.

(Aspect 3)

In Aspect 3, the at least one parasitic element of the predetermined antenna element further includes a reflector element disposed on a side opposite to the predetermined side with respect to the radiating element of the predetermined antenna element, and the at least one parasitic element of the predetermined other antenna element further includes a director element disposed on the predetermined side with respect to the radiating element of the predetermined other antenna element.

According to the above aspect, directivity is realized in the direction from the reflector element toward the director element of the predetermined antenna element. Also, radiation of radio waves from the radiating element of the predetermined antenna element can be induced to a side where the director element of the predetermined other antenna element is located. Accordingly, directivity on the lateral side with respect to the directivity direction of the predetermined antenna element can be improved as compared to a case where the predetermined other antenna element is not provided. According to the above aspect, directivity is realized in the direction from the reflector element toward the director element of the predetermined other antenna element. Also, radiation of radio waves from the radiating element of the predetermined other antenna element can be blocked to a side where the reflector element of the predetermined antenna element is located. Accordingly, directivity on the opposite side to the directivity direction of the predetermined other antenna element can be suppressed as compared to a case where the predetermined antenna element is not provided.

(Aspect 4)

In Aspect 4, arrangement directions of the radiating element and the at least one parasitic element of the plurality of antenna elements are substantially parallel to each other.

According to the above aspect 4, directivity of the plurality of antenna elements can be aligned substantially in the same direction.

(Aspect 5)

In Aspect 5, operating frequencies of the plurality of antenna elements are substantially the same as each other.

According to the above aspect, radio waves from the radiating element of at least one antenna element can be more likely to be affected by the parasitic element of at least one other antenna element as compared to a case where the operating frequencies of the plurality of antenna elements are different from each other.

(Aspect 6)

In Aspect 6, a distance between the radiating element of a predetermined antenna element of the plurality of antenna elements and the radiating element of a predetermined other antenna element of the plurality of antenna elements is approximately equal to or shorter than ¼ times a wavelength of an operating frequency of the predetermined antenna element or a wavelength of an operating frequency of the predetermined other antenna element.

According to the above aspect, radio waves from the radiating element of at least one antenna element can be more likely to be affected by the parasitic element of at least one other antenna element as compared to a case where the distance is longer than ¼ times the operating frequency.

(Aspect 7)

In Aspect 7, the antenna device further includes a dielectric covering at least a portion of the radiating element and the at least one parasitic element of at least one antenna element of the plurality of antenna elements.

According to the above aspect, the wavelength of radio waves radiated from the antenna element provided with the dielectric can be shortened as compared to a case where the dielectric is not provided. Accordingly, the length of the parasitic element for obtaining radio waves having a desired wavelength can be shortened as compared to a case where the dielectric is not provided. Thus, the height of the antenna device can be reduced as compared to a case where the dielectric is not provided.

It is apparent that the present invention is not limited to the above embodiment and modification examples, and may be modified and changed without departing from the scope and spirit of the invention.

REFERENCE NUMERALS

10, 10A, 10A1, 10A2, 10B, 10C antenna device
100A, 100B, 100C base
102A attachment seal member
112A rib
200A, 200B, 200C substrate
202A, 202B first corner portion
204A, 204B second corner portion
206A, 206B third corner portion
208A, 208B fourth corner portion
210A, 210B, 210C substrate attachment screw
212B antenna attachment screw
300A, 300B, 300C first antenna element
302C first dielectric
310A, 310B, 310C first radiating element
320A first director element
322A first attachment portion
322B, 322C first director element
324B, 324C second director element
326B first attachment portion
330A, 330B, 330C first reflector element
332A, 332B second attachment portion
400A, 400A1, 400A2, 400B, 400C second antenna element
402C second dielectric
410A, 410B, 410C second radiating element
420A second director element
422A third attachment portion
422B, 422C third director element
424B, 424C fourth director element
426B third attachment portion
430A, 430B, 430C second reflector element
432A, 432B fourth attachment portion
500A inner case
502A inner pad
510A case attachment screw
600A outer case
602A outer pad
700A fastener
710A fastening screw
720A washer
730A holder
X first direction
Y second direction
Z third direction

What is claimed is:

1. An antenna device comprising:

a rectangular base; and a plurality of straight antenna elements that protrude vertically from a periphery of the rectangular base, each of the plurality of straight antenna elements including a radiating element and at least one parasitic element, wherein the plurality of straight antenna elements are arranged in a direction intersecting with an arrangement direction of the radiating element and the at least one parasitic element of at least one antenna element of the plurality of straight antenna elements, wherein the at least one parasitic element of a predetermined antenna element of the plurality of straight antenna elements includes a director element disposed on a predetermined side with respect to the radiating element of the predetermined antenna element, wherein the at least one parasitic element of a predetermined other antenna element of the plurality of straight antenna elements includes a reflector element disposed on a side opposite to the predetermined side with respect to the radiating element of the predetermined other antenna element, wherein the at least one parasitic element of the predetermined antenna element further includes a reflector element disposed on a side opposite to the predetermined side with respect to the radiating element of the predetermined antenna element, wherein the at least one parasitic element of the predetermined other antenna element further includes a director element disposed on the predetermined side with respect to the radiating element of the predetermined other antenna element, and wherein an arrangement direction of the radiating element, the director element and the reflector element of the predetermined antenna element and an arrangement direction of the radiating element, the director element and the reflector element of the predetermined other antenna element are substantially parallel.

2. The antenna device according to claim 1, wherein arrangement directions of the radiating element and the at least one parasitic element of the plurality of straight antenna elements are substantially parallel to each other.

3. The antenna device according to claim 1, wherein operating frequencies of the plurality of straight antenna elements are substantially the same as each other.

4. The antenna device according to claim 1, wherein a distance between the radiating element of a predetermined antenna element of the plurality of straight antenna elements and the radiating element of a predetermined other antenna element of the plurality of straight antenna elements is approximately equal to or shorter than ¼ times a wavelength of an operating frequency of the predetermined antenna element or a wavelength of an operating frequency of the predetermined other antenna element.

5. The antenna device according to claim 1, further comprising:

a dielectric covering at least a portion of the radiating element and the at least one parasitic element of at least one antenna element of the plurality of straight antenna elements.

6. The antenna device according to claim 1, wherein the rectangular base is arranged in a horizontal plane.

7. The antenna device according to claim 1, wherein the antenna device is mounted on a roof of a vehicle.

8. An antenna device comprising:

a rectangular base; and a plurality of straight antenna elements that protrude orthogonally from a periphery of the rectangular base, each of the plurality of straight antenna elements including a radiating element and at least one parasitic element, wherein the plurality of straight antenna elements are arranged in a direction intersecting with an arrangement direction of the radiating element and the at least one parasitic element of at least one antenna element of the plurality of straight antenna elements, wherein the at least one parasitic element of a predetermined antenna element of the plurality of straight antenna elements includes a director element disposed on a predetermined side with respect to the radiating element of the predetermined antenna element, and wherein the at least one parasitic element of a predetermined other antenna element of the plurality of straight antenna elements includes a reflector element disposed on a side opposite to the predetermined side with respect to the radiating element of the predetermined other antenna element, wherein the at least one parasitic element of the predetermined antenna element further includes a reflector element disposed on a side opposite to the predetermined side with respect to the radiating element of the predetermined antenna element, wherein the at least one parasitic element of the predetermined other antenna element further includes a director element disposed on the predetermined side with respect to the radiating element of the predetermined other antenna element, wherein an arrangement direction of the radiating element, the director element and the reflector element of the predetermined antenna element and an arrangement direction of the radiating element, the director element and the reflector element of the predetermined other antenna element are substantially parallel.

9. The antenna device according to claim 8, wherein the rectangular base is arranged in a horizontal plane.

10. The antenna device according to claim 1, wherein a lower end of the parasitic element includes an attachment portion for the rectangular base.

11. The antenna device according to claim 8, wherein a lower end of the parasitic element includes an attachment portion for the rectangular base.

12. The antenna device according to claim 8, wherein the antenna device is mounted on a roof of a vehicle.

* * * * *